(12) United States Patent
Tsutsui et al.

(10) Patent No.: US 8,308,442 B2
(45) Date of Patent: Nov. 13, 2012

(54) INTEGRATED ELECTRIC COMPRESSOR

(75) Inventors: Kenji Tsutsui, Aichi-ken (JP); Makoto Hattori, Aichi-ken (JP); Takayuki Takashige, Aichi-ken (JP); Kazuki Niwa, Aichi-ken (JP); Koji Nakano, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 161 days.

(21) Appl. No.: 12/439,604

(22) PCT Filed: Sep. 28, 2007

(86) PCT No.: PCT/JP2007/069095
§ 371 (c)(1),
(2), (4) Date: Jun. 8, 2009

(87) PCT Pub. No.: WO2008/120408
PCT Pub. Date: Oct. 9, 2008

(65) Prior Publication Data
US 2010/0014988 A1 Jan. 21, 2010

(30) Foreign Application Priority Data
Mar. 29, 2007 (JP) ................. 2007-087210

(51) Int. Cl.
*F04B 49/06* (2006.01)
*F04B 35/04* (2006.01)
(52) U.S. Cl. ........................... 417/44.1; 417/411
(58) Field of Classification Search ......... 417/44.1, 417/410.1, 44.11, 410.3, 411
See application file for complete search history.

(56) References Cited

U.S. PATENT DOCUMENTS

| | | | | | |
|---|---|---|---|---|---|
| 3,279,377 | A | * | 10/1966 | Jacobson | 417/7 |
| 4,506,517 | A | * | 3/1985 | Pandzik | 62/175 |
| 4,575,668 | A | * | 3/1986 | Baker | 318/811 |
| 4,990,057 | A | * | 2/1991 | Rollins | 417/12 |
| 5,013,990 | A | * | 5/1991 | Weber | 318/814 |

(Continued)

FOREIGN PATENT DOCUMENTS

JP 62-77875 A 4/1987

(Continued)

OTHER PUBLICATIONS

International Search Report of PCT/JP2007/069095; Mailing Date of Dec. 18, 2007.

(Continued)

*Primary Examiner* — Charles Freay
*Assistant Examiner* — Alexander Comley
(74) *Attorney, Agent, or Firm* — Westerman, Hattori, Daniels & Adrian, LLP

(57) ABSTRACT

There is provided an integrated electric compressor having a circuit configuration capable of decreasing the size thereof while restraining current ripples. In an inverter of the electric compressor, by providing a capacitor 13 and a reactor 14 between a power source and an inverter board 12, the ripples of a driving voltage is restrained, and a motor can be driven with high efficiency and the size of a housing can be decreased. Further, by connecting the capacitor 13 and the reactor 14 to a power board 16 by using a bus bar 23, the voltage ripple restraining effect is further increased, and the capacitor 13 and the reactor 14 are unitized integrally by the bus bar 23 to improve the assembling workability of the power board 16.

6 Claims, 9 Drawing Sheets

U.S. PATENT DOCUMENTS

| | | | |
|---|---|---|---|
| 6,704,202 B1* | 3/2004 | Hamaoka et al. | 361/704 |
| 6,924,618 B2* | 8/2005 | Matsushiro et al. | 318/811 |
| 7,038,415 B2* | 5/2006 | Nakamura et al. | 318/471 |
| 7,176,644 B2* | 2/2007 | Ueda et al. | 318/400.14 |
| 2002/0149952 A1* | 10/2002 | Terashita et al. | 363/39 |
| 2004/0197213 A1* | 10/2004 | Takemoto | 417/410.1 |
| 2004/0227476 A1* | 11/2004 | Guerra et al. | 318/254 |
| 2005/0258796 A1* | 11/2005 | Kusaka | 318/801 |
| 2008/0095646 A1* | 4/2008 | Nishii et al. | 417/411 |
| 2008/0161974 A1* | 7/2008 | Alston | 700/276 |
| 2009/0263260 A1* | 10/2009 | Goto et al. | 417/410.1 |

FOREIGN PATENT DOCUMENTS

| | | |
|---|---|---|
| JP | 63-43591 A | 2/1988 |
| JP | 5-283283 A | 10/1993 |
| JP | 11-113247 A | 4/1999 |
| JP | 2002-314359 A | 10/2002 |
| JP | 2003-61365 A | 2/2003 |
| JP | 2003-199203 A | 7/2003 |
| JP | 2003-219650 A | 7/2003 |
| JP | 2004-135440 A | 4/2004 |
| JP | 2004-291770 A | 10/2004 |
| JP | 2005-20837 A | 1/2005 |
| JP | 2005-36773 A | 2/2005 |
| JP | 2005-218247 A | 8/2005 |

OTHER PUBLICATIONS

Japanese Office Action dated May 23, 2012, issued in corresponding Japanese Patent Application No. 2007-087210, (6 pages). W/ English Translation.

Notice of Allowance dated Aug. 21, 2012, issued in corresponding Japanese Patent Application No. 2007-087210, with English translation (5 pages).

* cited by examiner

INTEGRATED ELECTRIC COMPRESSOR

TECHNICAL FIELD

The present invention relates to an integrated electric compressor constituting an on-vehicle air conditioner.

BACKGROUND ART

In a compressor constituting an on-vehicle air conditioner, as shown in FIG. 7, a capacitor 9 is provided between a driving board 1 for driving a motor 5 and a dc power source (battery) to smooth a voltage supplied from the dc power source to the motor 5 (for example, refer to Patent Document 1).
Patent Document 1: Japanese Patent Laid-Open No. 2005-218247

DISCLOSURE OF THE INVENTION

Problems to be Solved by the Invention

As such a capacitor, a high-capacity capacitor has been used to sufficiently achieve a voltage smoothing effect. However, a large space is needed to provide the high-capacity capacitor.

In recent years, there has been provided an integrated electric compressor in which a compressor constituting an on-vehicle air conditioner, a motor for driving the compressor, and a driving board for driving the motor are housed integrally in a housing. On-vehicle equipment including the electric compressor is always required to be downsized. From this point of view, it is preferable that the capacitor 9 used for smoothing the supplied voltage also have a small size.

However, if a low-capacity capacitor 9 is used merely to save the space, the ripples of the voltage supplied from the battery increase undesirably.

The present invention has been made to solve the above technical problem, and accordingly an object thereof is to provide an integrated electric compressor having a circuit configuration capable of decreasing the size while restraining voltage ripples.

Means for Solving the Problems

An integrated electric compressor of the present invention made to achieve the above object includes a compressor constituting an air conditioner; a motor for driving the compressor; a control board for controlling the operation of the motor; and a housing for accommodating the compressor, the motor, and the control board. The integrated electric compressor is characterized in that the integrated electric compressor further includes a ripple reducing circuit formed by a capacitor and a reactor which are provided between a power source for applying a voltage to the motor and the control board to reduce the ripples of a voltage supplied from the power source, and the ripple reducing circuit is connected to the power source side and the control board by a bus bar.

Such a ripple reducing circuit can be realized by combining the capacitor with the reactor, and can achieve downsizing while restraining voltage ripples.

Also, the ripple reducing circuit is connected to the power source side and the control board side by the bus bar. Thereby, the bus bar itself can be provided with reactance, and can function as a part of the ripple reducing circuit.

Also, the capacitor, the reactor, and the bus bar can be unitized integrally by the bus bar connection, so that the assembling workability is improved.

The capacities of the capacitor and the reactor of the ripple reducing circuit are preferably set so as to avoid resonance with the rotation period of the motor.

Also, the capacities of the capacitor and the reactor of the ripple reducing circuit are preferably set so as to avoid resonance with the switching frequency of an inverter for driving the motor.

In the integrated electric compressor, since a floating capacity Cf is present between a motor 5 and a housing as shown in FIG. 8, if a power supply voltage supplied to the motor 5 is caused to fluctuate by the switching action of a driving board 1, a leakage current flowing from the motor 5 to the housing is generated. Since this leakage current produces radio noise, a proposal has been made that by providing common mode capacitors 2 and a common mode coil 3 on the driving board 1, a loop formed by the leakage current is made small in the case where the voltage supplied to the motor 5 is caused to fluctuate by the switching action of a switching element 4, by which an influence of radio noise is reduced.

However, the common mode capacitors 2 and the common mode coil 3 each have a large part size. Since on-vehicle equipment including the electric compressor is always required to be downsized, further improvement is desired from this point of view. Also, the large part size restricts the arrangement of these parts in the housing, which also hinders the downsizing.

Also, from the viewpoint of radio noise reduction as well, further improvement is required. As shown in FIG. 9, in the case where the common mode capacitors 2 and the common mode coil 3 are used, a lead wire (electric wire) 7 is used for wiring between driving board 1 and these parts. As the length of the lead wire 7 increases, the fluctuations in power supply voltage caused by the switching action of the driving board 1 increase, and an influence on radio noise increases. Also, the leakage current flowing from the motor 5 to the housing generates a high-frequency component due to surge caused especially when the current is turned off, so that the improvement in radio noise at this time is especially desired.

Thereupon, the control board preferably includes a switching element for controlling the application of a voltage to the motor from the power source to rotationally drive the motor; a control circuit for controlling the operation of the switching element; and a snubber circuit which is provided between the power source and the switching element to reduce radio noise and comprises a resistor and a capacitor.

Also, it is preferable that a control circuit board provided with the control circuit and the board provided with the switching element and the snubber circuit be provided so as to face to each other with a space being provided therebetween, and the element of the resistor and the element of the capacitor constituting the snubber circuit be surface mounted on the board on the side opposite to the side on which the control circuit board is arranged.

Also, the integrated electric compressor is suitable for being mounted on a vehicle.

Advantages of the Invention

According to the present invention, by providing the voltage ripple reducing circuit, the ripples of the driving voltage is restrained, and the motor can be driven with high efficiency. Since the sizes of the capacitor and the reactor constituting the voltage ripple reducing circuit can be decreased further as compared with the case where a high-capacity smoothing capacitor is used, the size of the housing can also be decreased.

Further, since the voltage ripple reducing circuit is connected by using the bus bar, the voltage ripple restraining effect is further increased. Also, since the capacitor and the reactor constituting the voltage ripple reducing circuit can be unitized integrally by the bus bar, the assembling workability is also improved.

Further, since the snubber circuit is provided in the circuit for driving the motor of the integrated electric compressor, radio noise is reduced. Since the snubber circuit can be made a surface mounting part, the leakage current is reduced, and the size of a closed loop formed by the leakage current is decreased, which is especially effective in reducing radio noise. Also, by making the snubber circuit a surface mounting part, the size of the electric compressor can be decreased.

DESCRIPTION OF SYMBOLS

10 ... electric compressor (integrated electric compressor), 11 ... housing, 12 ... inverter board (control board), 13 ... capacitor, 13a, 13b ... terminal, 14 ... reactor, 14a, 14b ... terminal, 15 ... control circuit board (control circuit), 16 ... power board (board), 18 ... switching element, 19 ... motor, 19a, 19b, 19c ... terminal, 20 ... input/output terminal, 20a, 20b ... PN terminal, 21 ... snubber circuit, 21c ... capacitor element, 21r ... resistive element, 23 ... bus bar, 23a, 23b ... power source-side terminal part, 23c, 23d ... board-side terminal part, 23e ... capacitor-side terminal part, 23f ... reactor-side terminal part, 23g ... joint part, 24 ... resin body, 24a ... support part

BEST MODE FOR CARRYING OUT THE INVENTION

The present invention will now be described in detail based on an embodiment shown in the accompanying drawings.

Figure 1:
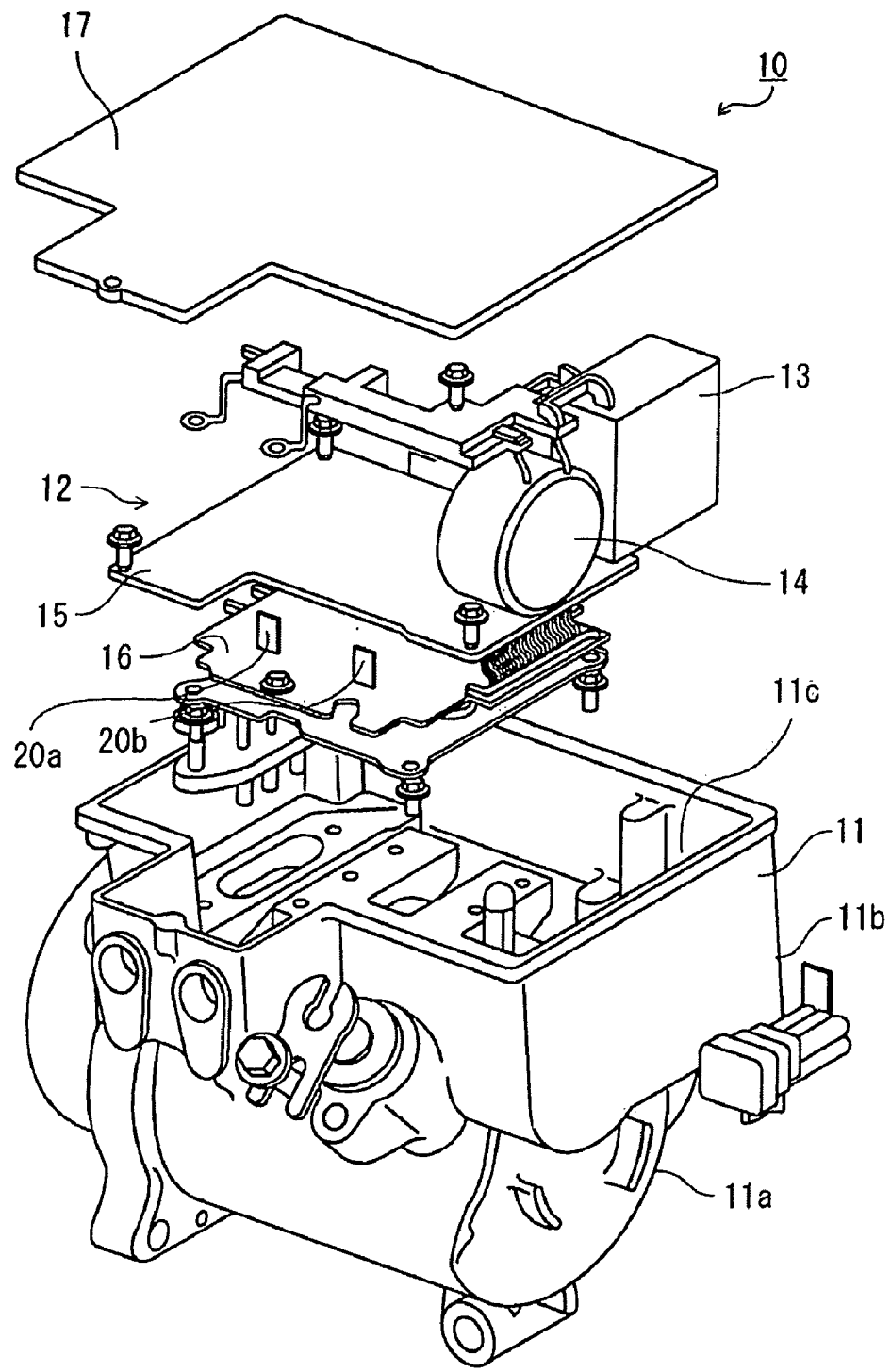
FIG. 1 is an exploded perspective view showing a general configuration of an electric compressor in accordance with an embodiment.

FIG. 1 is an exploded perspective view showing a configuration of an electric compressor (integrated electric compressor) of this embodiment.

As shown in FIG. 1, for an electric compressor 10, a motor (not shown) and a scroll compressor (not shown) are accommodated in a lower accommodation chamber 11a of a housing 11, and an inverter board (control board) 12 is accommodated in an upper accommodation chamber 11b, which is open upward, of the housing 11. The upward opening of the upper accommodation chamber 11b of the housing 11 is covered with a cover 17.

The inverter board 12 comprises a capacitor 13 and a reactor 14, which are used for smoothing a dc voltage supplied to the inverter board 12, a control circuit board (control circuit) 15 for controlling the application of a high-voltage alternating current to the motor, and a power board (board) 16 for converting a direct current supplied from a high-voltage power source to an alternating current and applying the alternating current to the motor to rotationally drive the motor.

Figure 2:
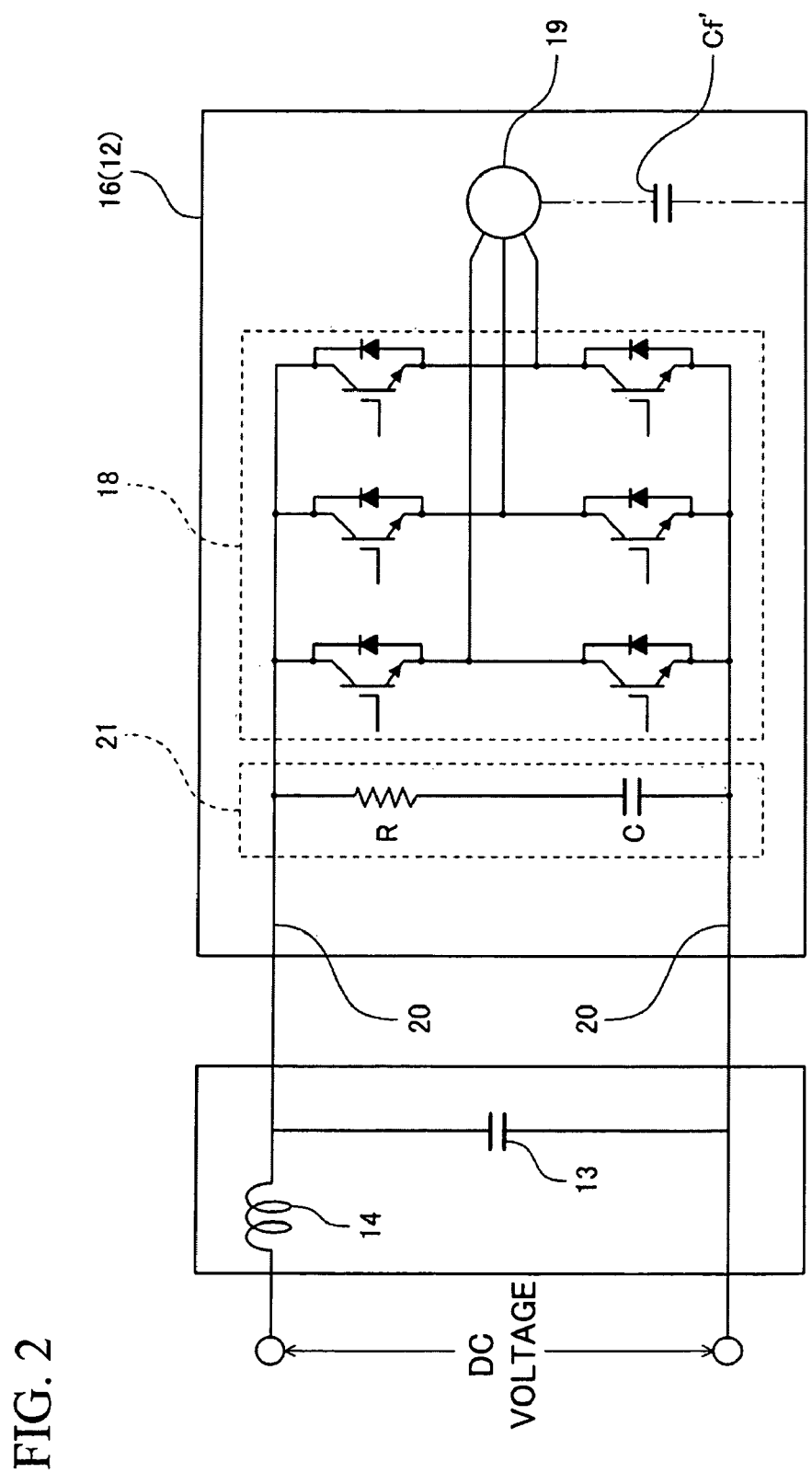
FIG. 2 is a diagram showing a circuit configuration of a power board.

As shown in FIG. 2, the capacitor 13 and the reactor 14 are provided so as to be interposed between an external dc power source (battery) and the inverter board 12, and decrease the ripples of a voltage supplied from the dc power source to smooth the dc voltage as a voltage ripple reducing circuit. The capacitor 13 used in this circuit has a low capacity. To compensate this low capacity, the reactor 14 is combined with the capacitor 13 to decrease the ripples of the dc voltage. This combination can decrease the size of the capacitor 13, and thus contributes to the downsizing of the housing 11 for accommodating the capacitor 13.

In the upper accommodation chamber 11b of the housing 11, a space 11c for accommodating the capacitor 13 and the reactor 14 is formed.

The capacities of the capacitor 13 and the reactor 14 are preferably set so as to reduce the ripples of the driving voltage supplied to drive a motor 19 and also to prevent resonance with the motor 19. When the motor 19 rotates, a ripple current having a motor rotation frequency component is generated in an inverter input current (direct current) according to the number of poles, the number of windings (the number of phases), the frequency of the current supplied to the motor 19 (operating frequency), and the like. If a motor rotation frequency at the time when the motor 19 rotates and a resonance point determined by the capacitor 13 and the reactor 14 lap on each other, resonance occurs. As a result, the ripple component of the inverter input current increases, which, in the worst case, exerts an adverse influence on high-voltage system equipment connected to the interior of vehicle. Therefore, to keep the ripple component of inverter input current to a minimum, the capacities of the capacitor 13 and the reactor 14 are preferably set so that the frequency of the driving current supplied to drive the motor 19 does not lap on the natural frequency at the time when the motor 19 rotates.

Also, the capacities of the capacitor 13 and the reactor 14 are preferably set so as to reduce the ripples of the driving voltage supplied to drive the motor 19 and also to prevent resonance with the carrier frequency of the three-phase driving current for driving the motor 19 (the switching frequency of an inverter).

Herein, the setting of the capacities of the capacitor 13 and the reactor 14 is considered.

As described above, if the resonance point Flc determined by the capacitor 13 and the reactor 14 laps on a direct current fluctuation frequency Fm or a carrier frequency Fpwm determined by the rotation of the motor 19, resonance occurs, and the ripple current of dc bus increases. Therefore, the capacitance C and the inductance L of the capacitor 13 and the reactor 14 must be selected so as to avoid the resonance point.

Taking the inductance of the reactor 14 as L(H), and the capacitance of the capacitor 13 as C(F), the resonance point Flc determined by the capacitor 13 and the reactor 14 is expressed by the following equation.

$$Flc = 1/(2 \times \pi \times (L \times C)^{1/2}) \quad (1)$$

The direct current fluctuation frequency Fm determined by the rotation of the motor 19 is determined by the specifications of the motor 19 and the inverter board 12. When the number of poles of the motor 19 is N, the rotational speed thereof is R (rps), and the number of phases of the inverter board 12 (the number of phases of the motor 19) is X, the direct current fluctuation frequency Fm(Hz) is expressed by the following equation.

$$Fm = N \times R \times X \times 2 \quad (2)$$

The carrier frequency Fpwm means a control frequency of a switching element 18 for controlling the output (current, voltage) of the inverter board 12. As the carrier frequency Fpwm, a frequency of, for example, 5 kHz or 10 kHz is used.

Since the resonance of the direct current fluctuation frequency Fm and the carrier frequency Fpwm must be avoided, the values of the inductance L and the capacitance C must be selected so that the resonance point Flc of the reactor 14 and the capacitor 13 is $$Fm(\text{maximum value}) < Flc < Fpwm \quad (3)$$

or $$Flc > Fpwm \quad (4)$$

As a specific example, for example, a case where the number of poles of the motor 19 is three, the rotational speed of the motor 19 is 0 to 100 rps, the number of phases of the inverter board 12 is three, and the carrier frequency Fpwm is 5 kHz is considered.

In this case, the rotation frequency Fm of the motor 19 is

Fm=0 Hz to 1800 Hz

According to Equation (3), 1.8 kHz<Flc<5 kHz so that the values of the inductance L and the capacitance C can be selected in the range of $1.0 \times 10^{-9} < L \times C < 7.8 \times 10^{-9}$.

According to Equation (4),

Flc>5 kHz so that the values of the inductance L and the capacitance C can be selected in the range of $L \times C < 1.0 \times 10^{-9}$.

Actually, either of the calculation results of Equation (3) and Equation (4) is used according to the cost, size, environment, and the like. The values of the inductance L of the actual reactor 14 and the capacitance C of the actual capacitor 13 are selected so as to fall within the above-described range considering large manufacture variations and allowance.

According to Equation (4), it seems that the inductance L and the capacitance C can be decreased to an unlimited extent. Actually, however, a power cable for high voltage is connected between the high-voltage battery mounted on a vehicle and the inverter board 12. This power cable also has an inductance component, and the inductance varies according to the length of cable. Therefore, the inductance L must be selected so as not to be affected by the inductance component of the power cable. Further, if the capacitance C decreases, the surge voltage at both ends of the switching element 18 increases, and, in the worst case, exceeds the withstand voltage of the switching element 18, so that the switching element 18 may be broken. Taking a surge voltage into consideration, the value of the capacitance C is then preferably selected. Therefore, it is further preferable that the capacitance C and the inductance L of the capacitor 13 and the reactor 14 be selected within the range obtained by Equation (3).

The ripples of the voltage supplied from the do power source is restrained by the capacitor 13 and the reactor 14 whose values of the capacitance C and the inductance L are selected as described above. Thereby, not only the motor 19 can be driven steadily, but also wasteful heat generation can be restrained and the rise in temperature of the capacitor 13 and the reactor 14 can be restrained. As a result, the normal operation of the inverter board 12 can be ensured even in an environment in which the temperature condition is severe.

FIG. 2 is a diagram showing a circuit configuration of the power board 16. As shown in FIG. 2, to the power board 16, a high voltage, for example, as high as 300 V is supplied from the external high-voltage power source (not shown). On the power board 16, the switching element 18 comprises a plurality of IGBTs is mounted. On the control circuit board 15, a microcomputer for controlling the operation of the switching element 18 and a gate circuit (both of the two not shown) are provided. The gate circuit is driven by the control of the microcomputer, and the drive signal thereof is transmitted from the control circuit board 15 to the power board 16 and is input to the switching element 18, by which the switching element 18 is operated. Thereby, the high voltage supplied from the high-voltage power source is applied to the motor 19 of the electric compressor 10 as a three-phase alternating current, by which the motor 19 is rotationally driven.

In the circuit of the power board 16 as described above, a snubber circuit 21 comprising a resistor R and a capacitor C is provided between input/output terminals 20 of the power source and the switching element 18.

The snubber circuit 21 is originally used for protecting the switching element 18 from overvoltage, and when the power source is off, the snubber circuit 21 consumes a surge occurring as the frequency of a drive signal sent from the control circuit board 15 to the switching element 18 increases.

By consuming the surge current in the snubber circuit 21 in this manner, a high-frequency component can be made so as not to be included in the drive signal sent from the control circuit board 15 to the switching element 18. As a result, a leakage current produced between the motor 19 and the housing 11 can be restrained, and radio noise can be reduced.

Figure 3:
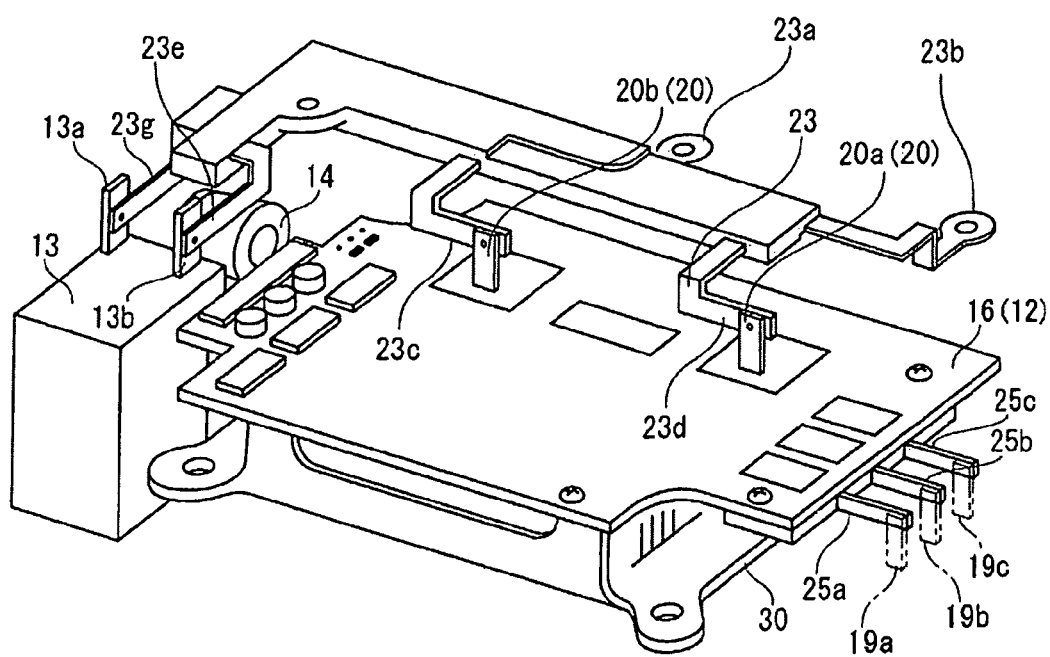
FIG. 3 is a perspective view showing a configuration for supplying electric power from a power source to a power board by using a bus bar.

In the above-described circuit configuration, power is supplied from the high-voltage power source to the power board 16 via the input/output terminals 20. As shown in FIG. 3, the input/output terminals 20 comprises pin-shaped PN terminals 20a and 20b mounted on the power board 16.

The electrical continuity to the PN terminals 20a and 20b is made by the connection of a bus bar 23 from the high-voltage power source side.

Figure 4:
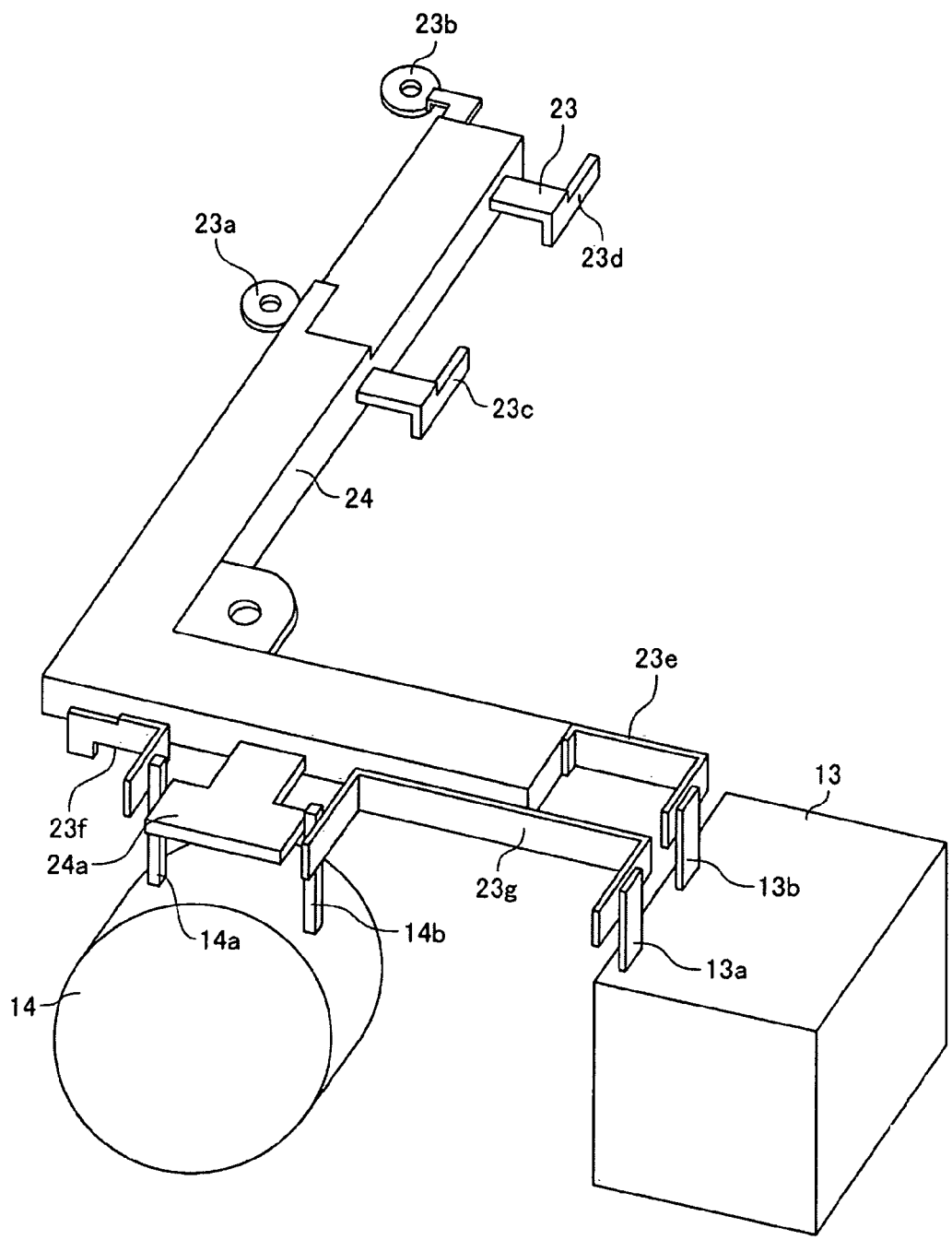
FIG. 4 is a perspective view showing a unit consisting of a capacitor, a reactor, and a bus bar.

As shown in FIGS. 3 and 4, with the bus bar 23, the capacitor 13 and the reactor 14 are unitized integrally. Specifically, the bus bar 23 comprises power source-side terminal parts 23a and 23b connected to the high-voltage power source side, board-side terminal parts 23c and 23d connected to the PN terminals 20a and 20b, a capacitor-side terminal part 23e connected to a terminal 13b of the capacitor 13, a reactor-side terminal part 23f connected to a terminal 14a of the reactor 14, and a joint part 23g that connects a terminal 13a of the capacitor 13 and a terminal 14b of the reactor 14 to each other, and the capacitor 13 and the reactor 14 are connected to each other by the bus bar 23 so as to provide a circuit configuration as shown in FIG. 2. The bus bar 23 can be made of copper (Cu) having a cross-sectional dimension of, for example, about 5 mm×1 mm. To the bus bar 23, the capacitor 13 and the reactor 14 have been welded in advance.

Further, the bus bar 23 excluding the terminal parts is coated with a resin body 24. The resin body 24 functions not only as an insulator for preventing short-circuit between bus bars 23 but also as a reinforcement for the bus bar 23. Thereby, the bus bar 23, the capacitor 13, and the reactor 14 can be handled as an integral unit.

Also, the resin body 24 comprises a substantially T-shaped support part 24a so as to reinforce a connecting part between the terminals 14a, 14b of the reactor 14 and the reactor-side terminal part 23f and the joint part 23g of the bus bar 23.

Since the capacitor 13 and the reactor 14 are connected to the power board 16 by the bus bar 23 in this manner, the bus bar 23 having a large cross section and a low resistance value as compared with a lead wire barely has reactance L, further enhances the effect of the reactor 14, and achieves a voltage ripple restraining effect.

Also, since the bus bar 23, the capacitor 13, and the reactor 14 are unitized integrally, the workability at the time when the inverter board 12 is assembled is improved as compared with the case where individual parts are assembled.

Also, since connection using the bus bar 23 is used for power wiring for applying a power supply voltage to the power board 16, the impedance of the power wiring can be reduced significantly as compared with the case where a lead wire is used. As a result, the fluctuations in the power supply voltage can be restrained, which contributes to the reduction in radio noise. In particular, in the case where the conventional common mode capacitor and common mode coil are used, as the length of lead wire increases, the impedance of the power supply wiring increases. Therefore, in the conventional construction, since the sizes of the common mode capacitor and common mode coil are large, the arrangement thereof is restricted, and the length of lead wire for power wiring increases resultantly. An advantage of the construction using the bus bar 23 of this embodiment is enormous as compared with such the conventional case.

Figure 5:
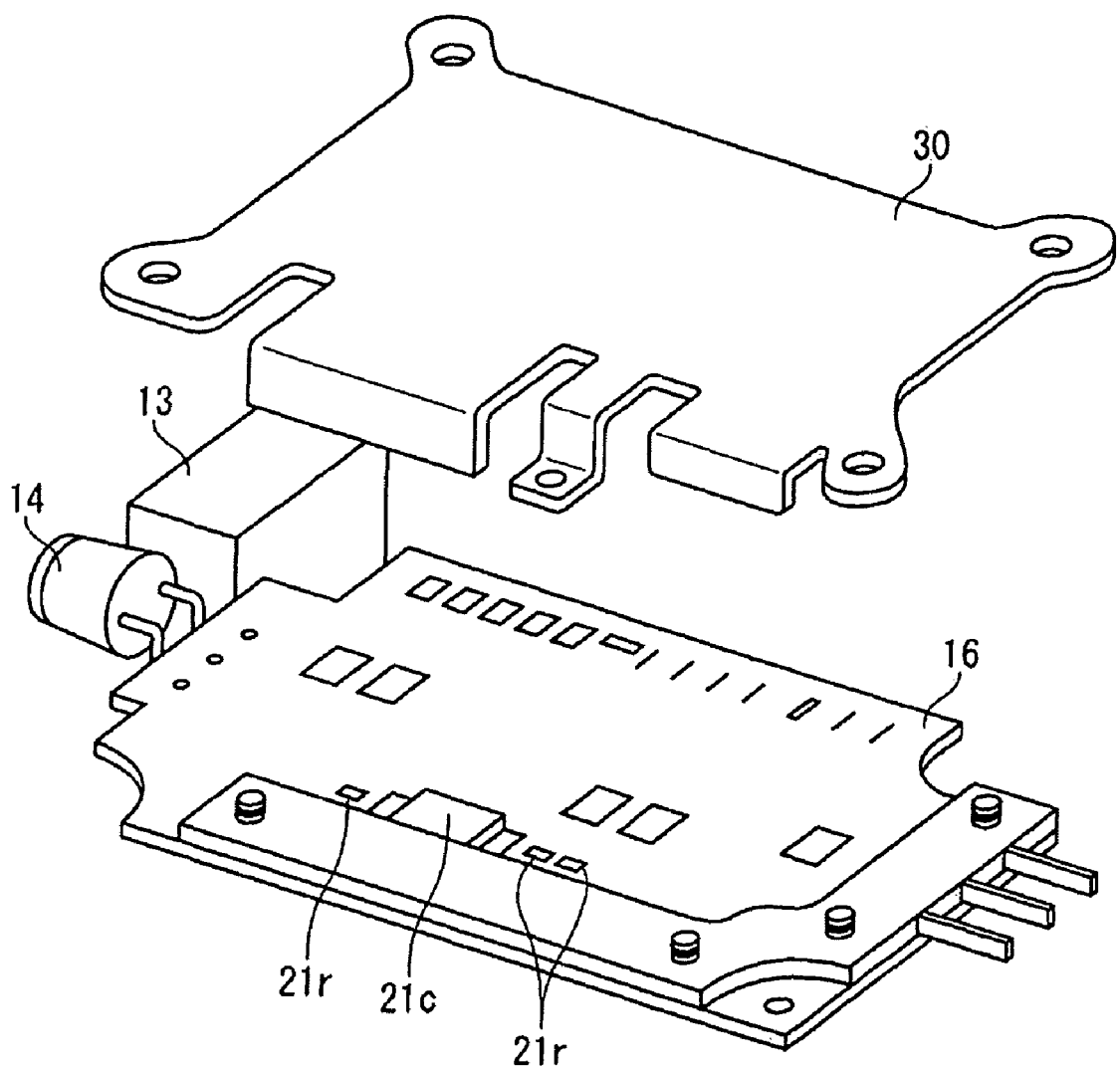
FIG. 5 is a perspective view showing a state in which a resistive element and a capacitor element constituting a snubber circuit are surface-mounted on a power board.

As shown in FIG. 5, the snubber circuit 21 is configured by surface mounting resistive elements 21r constituting a resistor R and a capacitor element 21c constituting a capacitor C on the power board 16. In the snubber circuit 21, since the capacitor capacity of the capacitor element 21c can be decreased, the surface mounting type snubber circuit 21 is realistic.

Since the resistive elements 21r and the capacitor element 21c are surface mounted on the power board 16, a space for providing the common mode capacitor and the common mode coil is substantially unnecessary as compared with the case where the conventional common mode capacitor and common mode coil are used, so that the size of the electric compressor 10 can be decreased.

Also, in the case where the conventional common mode capacitor and common mode coil are used, since the common mode capacitor and the common mode coil are inevitably arranged on the outside of the board because of their large sizes, the connection to the common mode capacitor and the common mode coil has conventionally been made by using a lead wire. In contrast, if the resistive elements 21r and the capacitor element 21c constituting the snubber circuit 21 are surface mounted on the power board 16, the resistive elements 21r and the capacitor element 21c naturally do not require a lead wire, so that the floating inductance can be reduced. Thereby, the radio noise reducing effect is further increased.

Also, if the resistive elements 21r and the capacitor element 21c constituting the snubber circuit 21 are surface mounted on the power board 16, a closed loop of current formed by a leakage current produced by a floating capacity Cf between the motor 19 and the housing 11 flows in the resistive elements 21r and the capacitor element 21c on the power board 16. That is to say, the closed loop formed by the leakage current does not extend to the outside from the power board 16, and is completed by between the power board 16 and the housing 11. The fact that the closed loop itself formed by the leakage current can be decreased contributes greatly to the reduction in radio noise.

Since the snubber circuit 21 having a leakage current restraining effect is provided, the leakage current is restrained, and radio noise is reduced. Further, since the snubber circuit 21 is surface mounted on the power board 16, the radio noise reducing effect is further remarkable.

As shown in FIG. 1, the control circuit board 15 and the power board 16 are provided so as to face to each other with a space being provided therebetween. Also, as shown in FIG. 5, the power board 16 is provided with a heat radiating plate 30 for radiating heat of the switching element 18.

Figure 6:
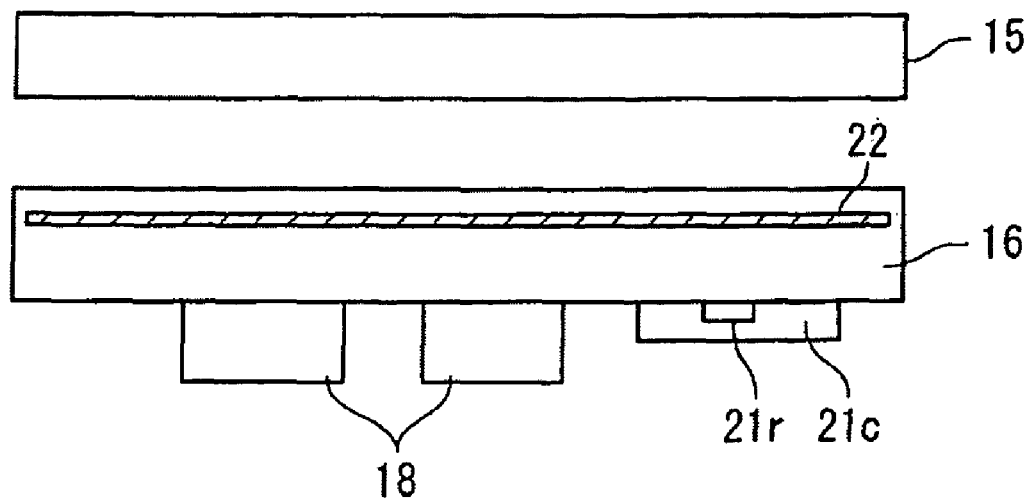
FIG. 6 is a side view showing an arrangement of a snubber circuit with respect to a control circuit board.
Figure 7:
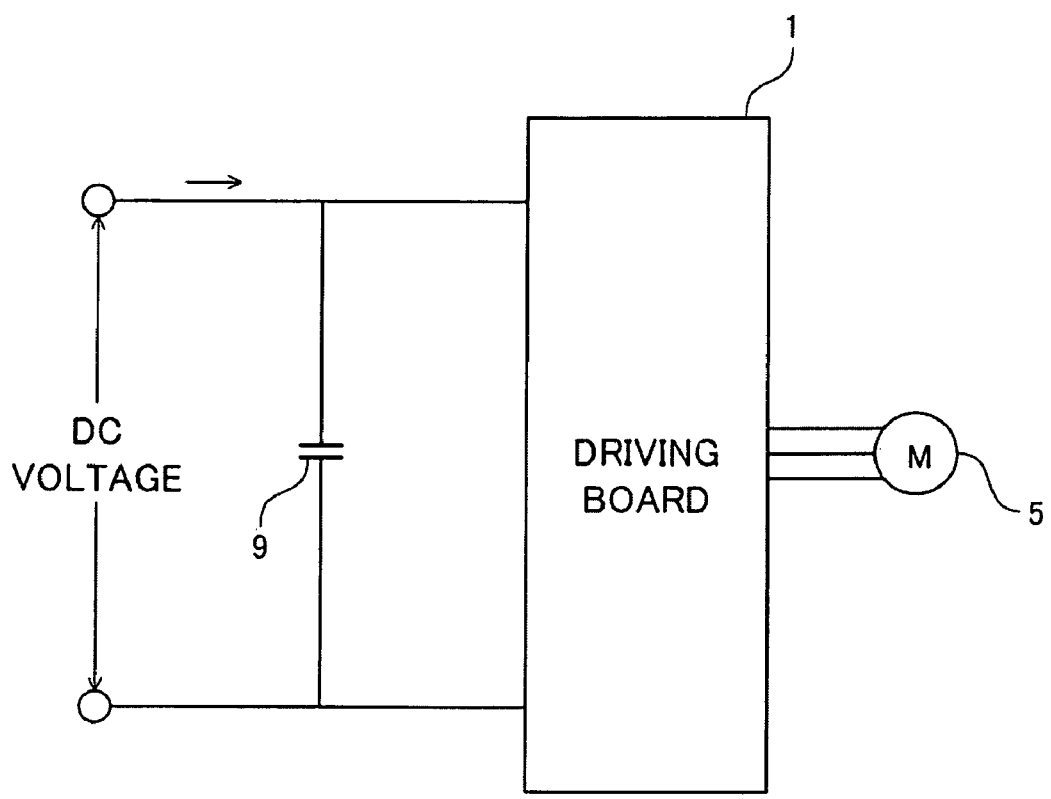
FIG. 7 is a diagram showing a conventional circuit configuration for decreasing voltage ripples.
Figure 8:
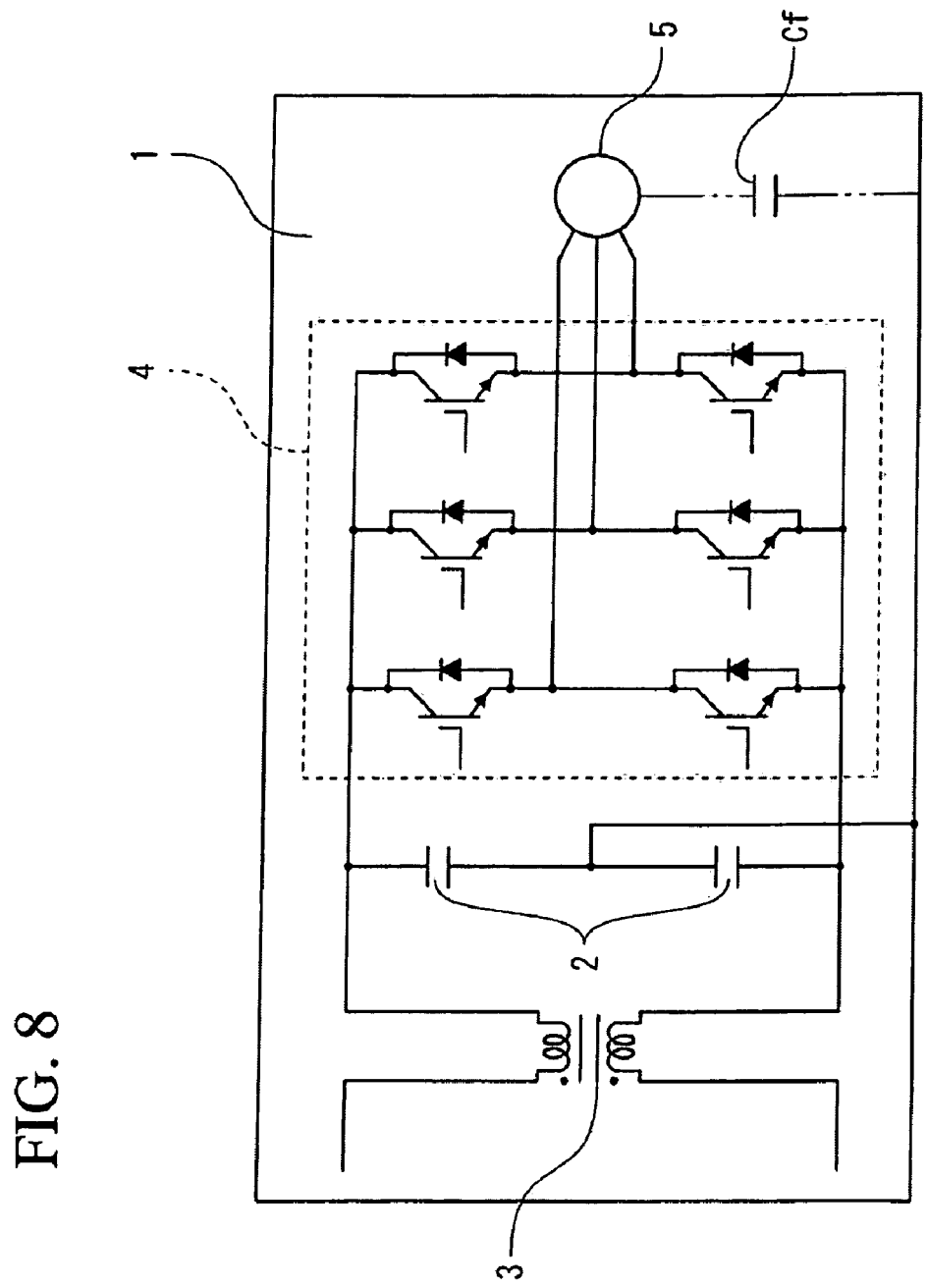
FIG. 8 is a diagram showing a circuit configuration of a conventional motor driving circuit.
Figure 9:
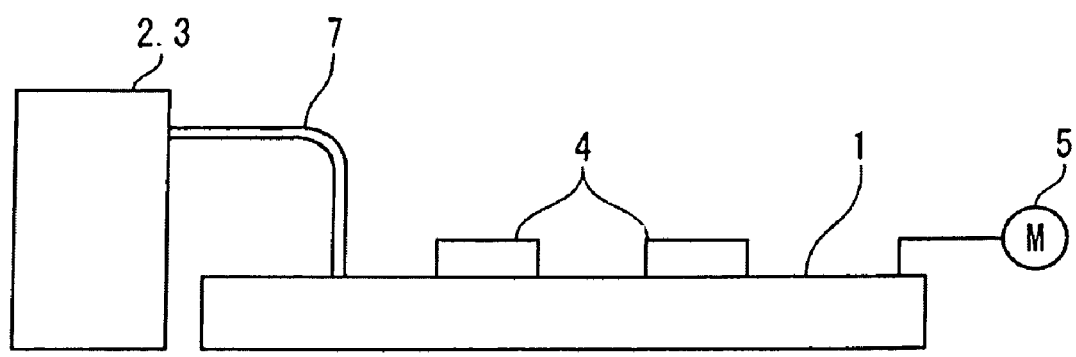
FIG. 9 is a side view showing an example of an arrangement in a case where a common mode capacitor and a common mode coil are used.

As shown in FIG. 6, the resistive element 21r and the capacitor element 21c constituting the snubber circuit 21 and the switching element 18 are preferably surface mounted on the power board 16 on the side opposite to the side on which the control circuit board 15 is arranged.

By doing this, by a surface (layer) 22 having low impedance, which is formed of a conductive material, such as a power frame, a GND frame, or a GND layer, provided in the power board 16, an effect of shielding noise generated by the switching element 18 and the like is achieved, and an influence on the control circuit board 15 is restrained. Since the control circuit board 15 is provided with a digital circuit such as a microcomputer driven by a low voltage, by restraining noise from the switching element 18, malfunction of the microcomputer and the like can be prevented.

Also, as shown in FIG. 3, the power board 16 is provided with PWM terminals 25a, 25b and 25c for connecting the switching element 18 to the motor 19. These PWM terminals 25a, 25b and 25c are also connected to terminals 19a, 19b and 19c on the motor 19 side by a bus bar.

As described above, according to the present invention, by providing the capacitor 13 and the reactor 14, the ripples of the driving voltage is restrained, and the motor 19 can be driven with high efficiency. Also, since the sizes of the capacitor 13 and the reactor 14 can be decreased, the size of the housing 11 can also be decreased.

Further, since the capacitor 13 and the reactor 14 are connected to the power board 16 by using the bus bar 23, the voltage ripple restraining effect is further increased, and also since the capacitor 13 and the reactor 14 are unitized integrally by the bus bar 23, the assembling workability of the power board 16 is also improved.

In addition, since the snubber circuit 21 is provided, the leakage current from the motor 19 is restrained and radio noise is reduced, and further the size of the electric compressor 10 can be decreased.

In the above-described embodiment, the shapes and constructions of parts of the electric compressor 10, the configuration of the inverter board 12, and the like have been explained. However, the present invention is not limited to the above-described configurations for other matters than the spirit of the present invention.

The configurations described in the above embodiment can be selected or can be changed appropriately without departing from the spirit and scope of the present invention.

The invention claimed is:

1. An integrated electric compressor comprising:
a compressor constituting an on-vehicle air conditioner;
a motor for driving the compressor;

a control board for controlling the operation of the motor; and a housing for accommodating the compressor, the motor, and the control board, characterized in that the integrated electric compressor is mounted on a vehicle, the integrated electric compressor further comprises a ripple reducing circuit which is provided between a battery which is a DC power source for applying a voltage to the motor and the control board to reduce ripples of a DC voltage supplied from the battery, wherein the ripple reducing circuit comprises a capacitor and a reactor, wherein capacities of the capacitor and the reactor of the ripple reducing circuit are set so as to avoid resonance with a rotation period of the motor and resonance with a switching frequency of an inverter for driving the motor, wherein taking an inductance of the reactor as L, and a capacitance of the capacitor as C, a resonance point F1c determined by the reactor and the capacitor is expressed by the following equation (1), $$F1c = 1/(2*\pi*(L*C)^{1/2}) \quad (1)$$

and as to the resonance point F1c, the inductance L and the capacitance C are selected so that the following relationship (3) holds direct current fluctuation frequency Fm (maximum value) <F1c<carrier frequency Fpwm . . . (3).

2. The integrated electric compressor according to claim 1, wherein the ripple reducing circuit is connected to the power source side and the control board by a bus bar having a rectangular cross-section.

3. The integrated electric compressor according to claim 1, wherein the control board comprises:

a switching element for controlling the application of a voltage to the motor from the power source to rotationally drive the motor;

a control circuit for controlling the operation of the switching element; and a snubber circuit which is provided between the power source and the switching element to reduce radio noise and which comprises a resistor and a capacitor.

4. The integrated electric compressor according to claim 3, wherein the resistor and the capacitor constituting the snubber circuit are surface mounted on a board.

5. The integrated electric compressor according to claim 4, wherein a control circuit board provided with the control circuit and the board provided with the switching element and the snubber circuit are provided so as to face to each other with a space being provided therebetween, and the element of the resistor and the element of the capacitor constituting the snubber circuit are surface mounted on the board on the side opposite to the side on which the control circuit board is arranged.

6. The integrated electric compressor according to claim 2, wherein the capacitor, the reactor, and the bus bar are integrated.

* * * * *